United States Patent [19]

Smith

[11] Patent Number: 5,537,471
[45] Date of Patent: Jul. 16, 1996

[54] WEATHERPROOF TELEPHONE STATION PROTECTORS

[75] Inventor: Thomas J. Smith, Bay Shore, N.Y.

[73] Assignee: TII Industries Inc., Copiague, N.Y.

[21] Appl. No.: 173,162

[22] Filed: Dec. 27, 1993

[51] Int. Cl.$^6$ .............. H01R 4/24; H04M 1/74; H02H 3/22
[52] U.S. Cl. .............. 379/412; 361/119; 439/417; 439/395
[58] Field of Search ............... 379/399, 412, 379/413; 439/92, 95, 395, 404, 417, 418, 709, 711, 712, 717; 361/56, 119, 120, 124, 127, 129; 337/34, 32

[56] References Cited

U.S. PATENT DOCUMENTS

| | | | |
|---|---|---|---|
| D. 347,438 | 5/1994 | Smith | D14/240 |
| 3,960,425 | 6/1976 | Kirk, Jr. et al. | 339/17 |
| 4,123,132 | 10/1978 | Hardy et al. | 439/709 |
| 4,362,347 | 12/1982 | Berglund et al. | 361/120 |
| 4,444,447 | 4/1984 | Markwardt | 339/98 |
| 4,614,396 | 9/1986 | Saligny | 439/395 |
| 5,153,911 | 10/1992 | Smith | 379/399 |
| 5,224,013 | 6/1993 | Pagliuca | 361/119 |
| 5,307,231 | 4/1994 | Smith | 361/127 |
| 5,359,654 | 10/1994 | Jensen et al. | 379/399 |
| 5,368,501 | 11/1994 | Asbell | 439/418 |
| 5,423,694 | 6/1995 | Jensen et al. | 439/417 |

*Primary Examiner*—Jeffery A. Hofsass
*Assistant Examiner*—Scott L. Weaver
*Attorney, Agent, or Firm*—Martin Sachs

[57] ABSTRACT

A weatherproof telephone station protector module suitable for use exposed to the weather including a hollow housing with first and second sealed test terminals and a plurality of through apertures adapted to receive a plurality of insulated electrically conductive wires. A threaded bolt when rotated permits the top housing member to be received by the bottom housing member and at the same time provides the force necessary to sever the insulation of the electrically conducting wires thereby providing a shorting mechanism between insulated conductors placed in the apertures provided. The upper or top portion of the housing is retained by the lower or bottom portion of the housing so that the removal of the bolt would not cause the upper and lower or bottom housings to be separated. The lower housing additionally includes overvoltage surge protection together with fail-safe thermal overload protection.

22 Claims, 4 Drawing Sheets

WEATHERPROOF TELEPHONE STATION PROTECTORS

BACKGROUND OF THE INVENTION

1. Field of the Invention

The present invention relates to telephone station protectors, and more particularly, to a weatherproof telephone station protection suitable for outdoor use and includes means for holding the insulated wires in position until they are connected together.

2. Description of the Relevant Art

There are numerous devices available which are fabricated in two piece assemblies wherein an insulated wire is placed in a hollow housing and a second member is forced into the housing permitting the internal shorting mechanism to sever the insulation connecting the two wires together. Typical of this type of device is disclosed in the patent to Markwardt, U.S. Pat. No. 4,444,447, which issued on Apr. 24, 1984.

An additional weatherproof telephone station protector is disclosed in U.S. Pat. No. 5,307,231, filed by Thomas J. Smith on Mar. 25, 1992, and which issued on Apr. 26, 1994, which functions in a manner similar to that to be described for the instant invention.

The patent to Kirk, Jr., et al., U.S. Pat. No. 3,960,425, which issued on Jun. 1, 1976, discloses a harness cable connector adapted to receive a plurality of insulated wires by a press fit retaining them in a spaced configuration during insertion and assembly of the wires into a printed circuit board.

The instant invention attempts to overcome the shortcomings known in the prior art wherein the two piece housings do not have any method for retaining the wires in position prior to the pressure exerted for shorting the wires together. In addition, the prior art has not shown the use of overvoltage protection together with back-up thermal protection and/or back-up air gap protection together with the holding mechanisms, as is disclosed in the instant invention.

Therefore, it is an object of the present invention to provide a weatherproof telephone station protector module suitable for use exposed to the weather.

It is another object of the present invention to provide a weatherproof telephone station protector module which although constructed with two pieces may be held together without the use of any retaining screws or bolts until they are used.

It is still yet another object of the present invention to provide a telephone station protector module which includes means for retaining the wires to be connected together in their position until the actual piercing of the insulation can be made and the wires connected together.

It is still yet another object of the present invention to provide a weatherproof telephone station protector suitable for connecting together insulated electrically conductive wires of different sizes.

It is still yet another object of the present invention to provide a reliable telephone station protector module which includes overvoltage protection and is handy to use in the field since all of the pieces are together prior to use.

It is still yet another object of the present invention to provide a reliable weatherproof telephone station protector which permits the splicing of wires of the same or different sizes together requiring no special technique or tools and includes overvoltage and back-up protection in a single module.

Therefore, the present invention provides an apparatus, which overcomes the shortcomings found in the prior art and is capable of insuring a reliable module for overvoltage protection on telephone communication lines.

SUMMARY OF THE INVENTION

A weatherproof telephone station protector module suitable for outside use exposed to the weather comprises in combination; an elongated hollow housing top member having a longitudinal axis and a transverse axis, a top surface, front and rear surface, and an open bottom. The top surface of the hollow housing top member includes a first and a second sealed test terminal disposed thereon. The first sealed terminal is adapted to be in electrically conductive contact with the first group of shorting terminals. The second sealed test terminal is adapted to be in electrically conductive contact with the second group of shorting terminals. A plurality of through apertures are spaced apart on the top surface, which is at an oblique angle to the transverse axis of the top member, are adapted to receive a plurality of insulated electrically conductive wires therein. A through aperture disposed between said shorting terminals is adapted to receive a threaded bolt therein. A pair of elongated eye members extend below the open bottom of the front and rear surfaces of the housing top member which are adapted to receive a protruding member disposed on the front and rear surface of the hollow housing member. The threaded bolt is adapted to be received into the through aperture provided between the groups of shorted terminals and is received into a threaded aperture provided in the bottom member.

The elongated hollow housing bottom member top surface includes a pair of elongated through slots, one being disposed on either side of the centrally disposed threaded aperture. A first and second shorting terminal is included in each of the elongated through slots. The shorting terminals include a plurality of channels suitable to obliquely cut the insulation of a plurality of the insulated electrically conductive wires inserted therein. An overvoltage protection device together with a back-up surge arrestor is disposed within the hollow of said lower housing member, a pair of back-up surge arresters are disposed between the ground terminal and the first and third terminal of the overvoltage protection device. A first and second holding bracket is provided for removably retaining the overvoltage protection device whereby, when the bottom housing member is inserted into the top housing member and the threaded bolt is inserted into the bottom member threaded aperture and rotated the insulated wires are forced into each of the shorting terminals, via the plurality of through apertures disposed on the top surface of the top member, and become in electrically conductive contact with each other.

The foregoing and other objects and advantages will appear from the description to follow. In the description, reference is made to the accompanying drawing which forms a part hereof, and which is shown by way of illustration a specific embodiment in which the invention may be practiced.

This embodiment will be described in sufficient detail to enable those skilled in the art to practice the invention, and it is to be understood that other embodiments may be utilized and that structural changes may be made without departing from the scope of the invention.

The following detailed description is, therefore, not to be taken in the limiting sense, and the scope of the present invention is best defined by the appended claims.

BRIEF DESCRIPTION OF THE DRAWING

In order that the invention may be more fully understood, it now will be described, by way of example, with reference to the accompanying drawing, in which.

DESCRIPTION OF THE PREFERRED EMBODIMENT

Figure 1A:
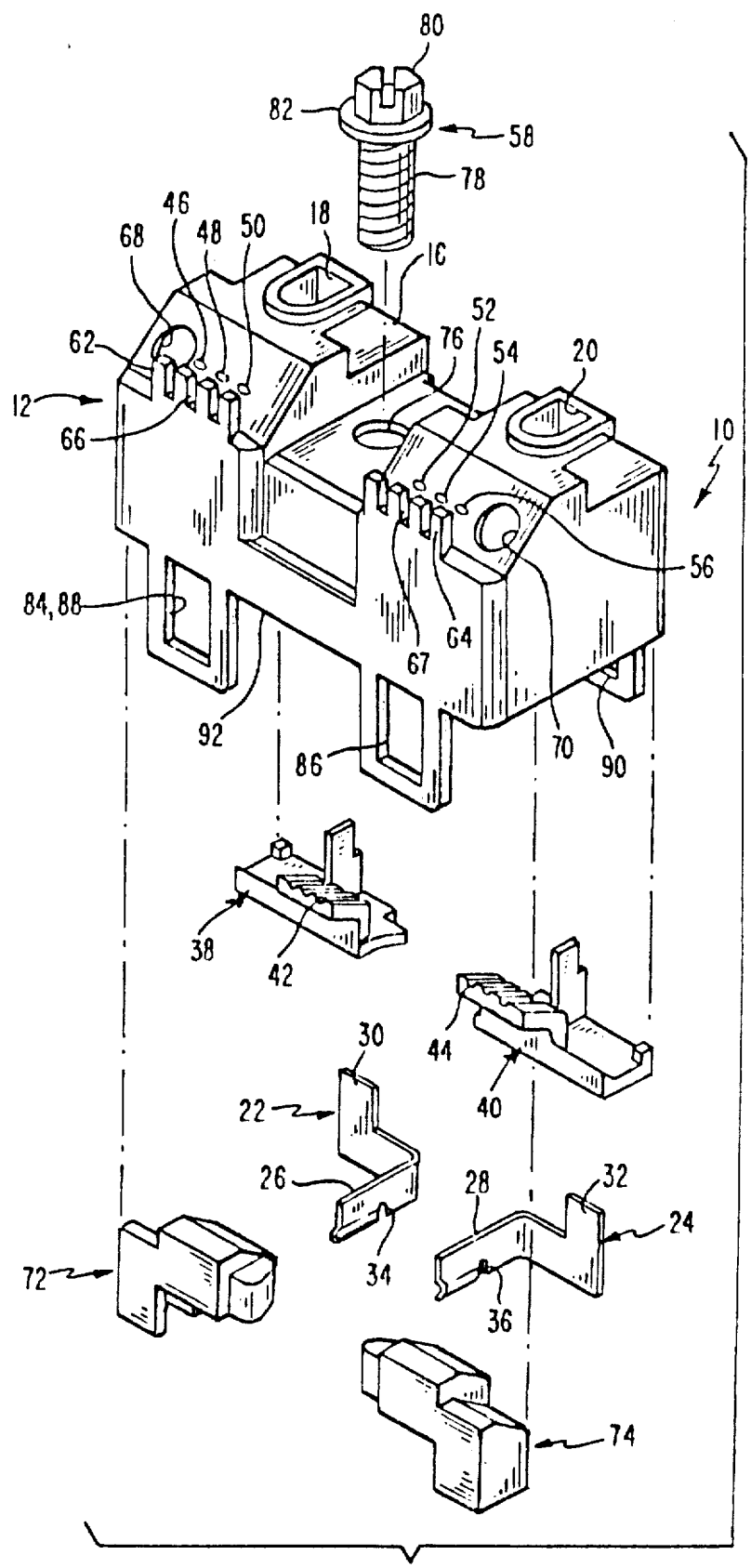
FIG. 1A, is an exploded view in perspective of a top or upper portion weatherproof telephone station protector, according to the principles of the present invention.
Figure 1B:
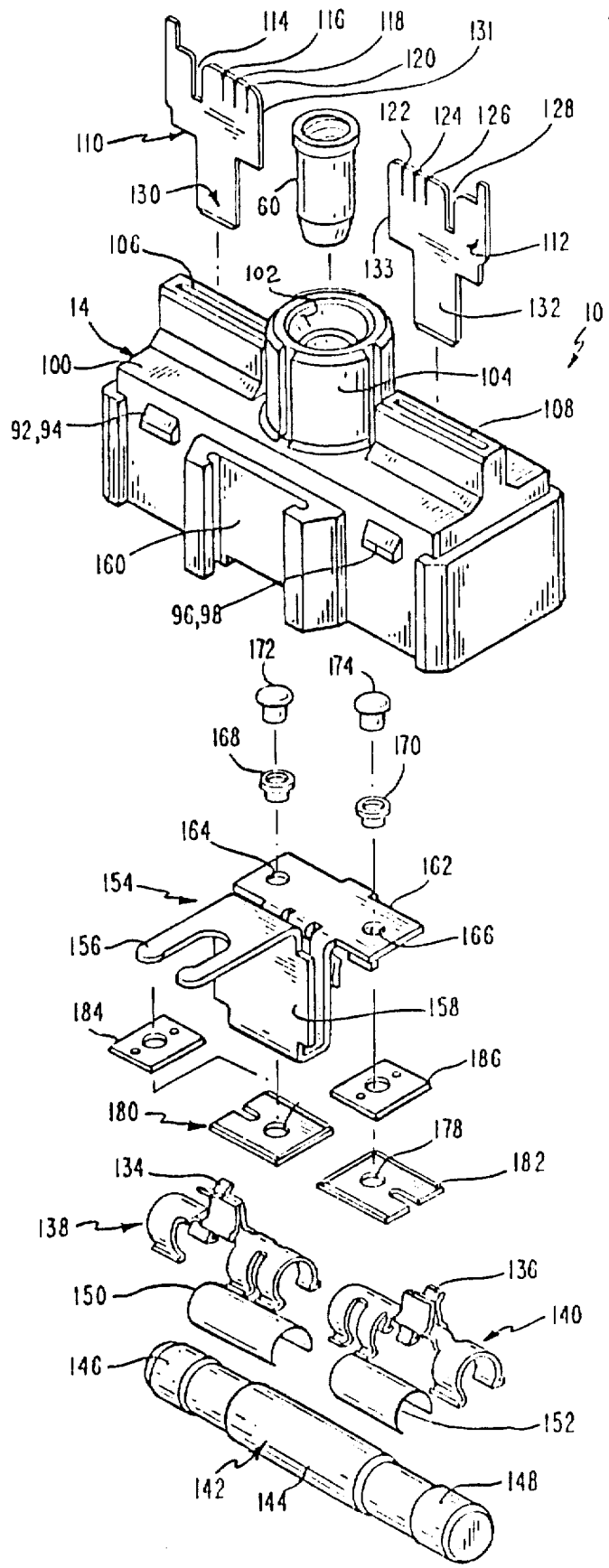
FIG. 1B, is an exploded view in perspective of the lower or bottom portion of the protector shown in FIG. 1A.

Referring now to the figures, and in particular to FIGS. 1A and 1B, which are an exploded isometrical view of the weatherproof telephone station protector module 10, according to the principles of the present invention, with the hollow housing top member and the hollow housing bottom member 14 and the components disposed therein.

The upper housing member 12 is hollow and the top surface 16 thereof includes a pair of test terminals 18 and 20 having disposed therein a metallic electrically conductive member 22 and 24 extending into the test terminal and is provided with a portion 26 and 28, respectively, extending at right angles to the portions 30 and 32 that extend into the test terminal openings 18 and 20. The portions 26 and 28, respectively, of conductive members 22 and 24 are provided with slotted apertures 34 and 36 whose function will be explained hereinafter. Wire guide members 38 and 40 are provided with a plurality of sloped channels 42 and 44, respectively, which are adapted to guide the insulated wires inserted into the top surface apertures 46, 48, 50, 52, 54 and 56. The wires, not shown for clarity, inserted into these apertures are relatively small in gauge and therefore may readily fall out of the apertures prior to the insertion of the clamping bolt 58 being seated into the threaded insert 60 provided in the hollow lower housing 14. Thus, in order to hold the relatively small gauge wires into the apertures 46, 48, 50, 52, 54 and 56 a series of finger like combs with the openings 66 and 68 retain the wires, not shown. Once seated therein they extend into the apertures and they are retained in position until the clamping bolt 58 engages the threaded insert 60, disposed in the lower housing 14. Apertures 68 and 70 are much larger in size and accommodate wires of a heavier gauge where it is not necessary to guide and hold the wires until the upper housing member 12 thoroughly engages the lower housing member 14, as will be explained hereinafter.

In addition, holding members 72 and 74 are received together with the guide members 38 and 40 and the electrically conductive members 22 and 24 into the hollow of upper housing member 12.

The upper housing member 12 is also provided with a through aperture 76 adapted to receive the threaded portion of the bolt 58 therein. The top head portion 80 of bolt 58 is provided with a slot suitable for use by a screw driver or is shaped to be received into a hex tool. A collar 82 provided on the head portion 80 is greater in diameter than the aperture 76 and when completely tightened down prevents moisture from entering the upper housing member 12 and is held captive therein, in a conventional manner.

The upper housing member 12 is provided with a pair of elongated eye members 84 and 86, which extend beneath the bottom edge 92 of the upper housing member 12 and are adapted to receive protruding portions 92, 94, 96 and 98, respectively, provided on the lower housing member 14.

Referring now specifically to FIG. 1B, it can be seen that the top surface 100 of the lower housings member 14 is provided with a centrally disposed aperture 102 adapted to retain the threaded insert 60 therein, as was described earlier. Surrounding aperture 102 there is provided a cylindrically shaped portion 104 provided on the top surface 100 of the lower housing member 14 which is disposed in between two elongated through slots 106 and 108 that are adapted to receive shorting terminals 110 and 112, respectively, therein. The shorting terminals 110 and 112 are provided with a plurality of cutting slots 116, 118 and 120, which are in line with the apertures 46, 48 and 50, respectively. Shorting terminal 112 is provided with cutting slots 122, 124, and 126 which are in line with the apertures 52, 54 and 56 provided in the top surface 16 of the upper housing member 12, respectively. Cutting slots 114 and 128 are adapted to be in alignment with apertures 68 and 70, respectively, disposed on the top surface 16 of the upper housing member 12. The edge portions 130 and 132 of the shorting terminals 110 and 112 are adapted to be in electrically conductive contact with the portion 34 and 36 of electrically conductive members 22 and 24, respectively, when assembled.

The lower portions 130 and 132 of shorting terminals 110 and 112 extend through slots 106 and 108 into the hollow of lower housing member 14 and enter into and make electrically conductive contact with the clamping portions 134 and 136 of fail-short clips 138 and 140, respectively.

The fail-short clips 138 and 140 are adapted to receive a gas tube voltage arrestor 142 therein. The gas tube overvoltage arrestor 142 is provided with a ground terminal 144 and first and second line terminals 146 and 148, respectively. When the gas tube overvoltage arrestor 142 is inserted in the fail-short clip members 138 and 140 a thermally sensitive sheet member 150 and 152 is placed between the line terminals 146 and ground terminal 144 and line terminal 148 and ground terminal 144, respectively, so that the fail-short clips 138 and 140 do not connect the line terminals to ground. However, should an overheating of the voltage arrester 142 occur the thermally sensitive sheet members 150 and 152 will melt due to overheating and short the line terminals to ground, via the fail-short clip 138 or 140. It is to be noted that the gas tube overvoltage arrester 142 may be replaced with a solid state device having the same mechanical configuration.

A ground terminal 154 is provided by an electrically conductive clip member having an outwardly extending portion 156 suitable for connection to the ground of a telephone communication system, not shown, and has a second portion 158 at right angles to outwardly extending portion 156, which is folded back upon itself so that it may engage the wall 160 of the lower housing member and be retained thereby. A third portion 162 that is provided with two apertures 164 and 166 is adapted to receive insulated shoulder washers 168 and 170 therein, respectively. The rivets 172 and 174 are adapted to be received by the insulated shoulder washers 1613 and 170 and be received into apertures 176 and 178 provided in air gap plates 180 and 182, respectively, and are held in place as is the dielectric members (3 mils of polyester fibers) 184 and 186 when rivets 172 and 174 are swaged over, in a conventional manner.

It has been noted that the lower housing member 14 has been rotated 180° related to upper housing member 12 in order to more clearly illustrate the ground connection terminal.

Figure 2:
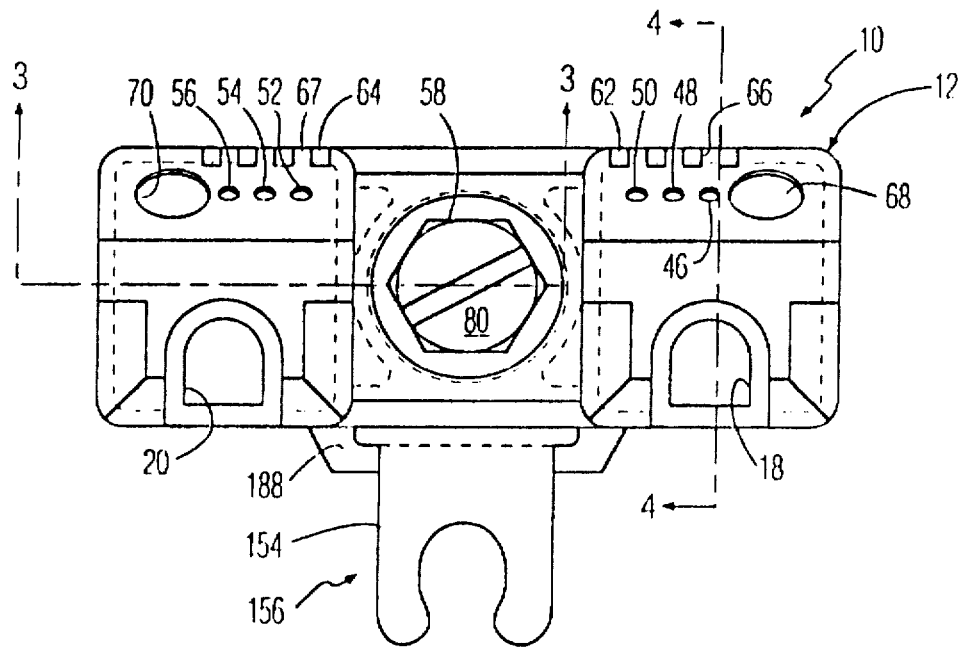
FIG. 2, is a top plan view of the assembled telephone station protector shown in FIGS. 1A and 1B.

Referring now to FIG. 2, which is a top plan view of the assembled weatherproof telephone station protector module shown in FIGS. 1A and 1B. You will note that a protruding channel 188 is provided on the ground side of the lower housing member 14 which is adapted to receive the ground terminal member therein.

Figure 3:
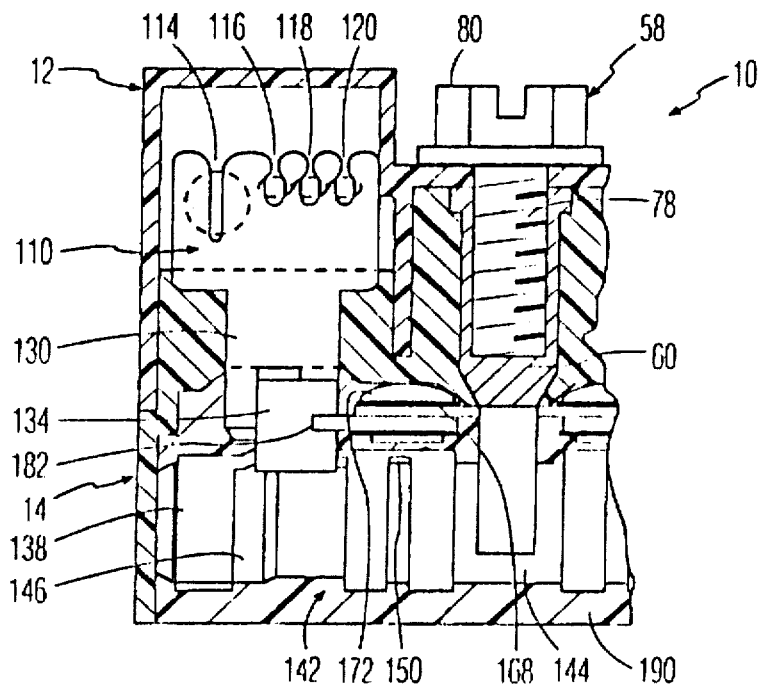
FIG. 3, is a partial elevational view in cross-section taken along line 3—3 of FIG. 2.

Referring now to FIG. 3, which is an enlarged cross-sectional view in elevation taken along line 3—3 of FIG. 2, which clearly shows the orientation of the components as shown in the exploded view of FIGS. 1A and 1B.

Figure 4:
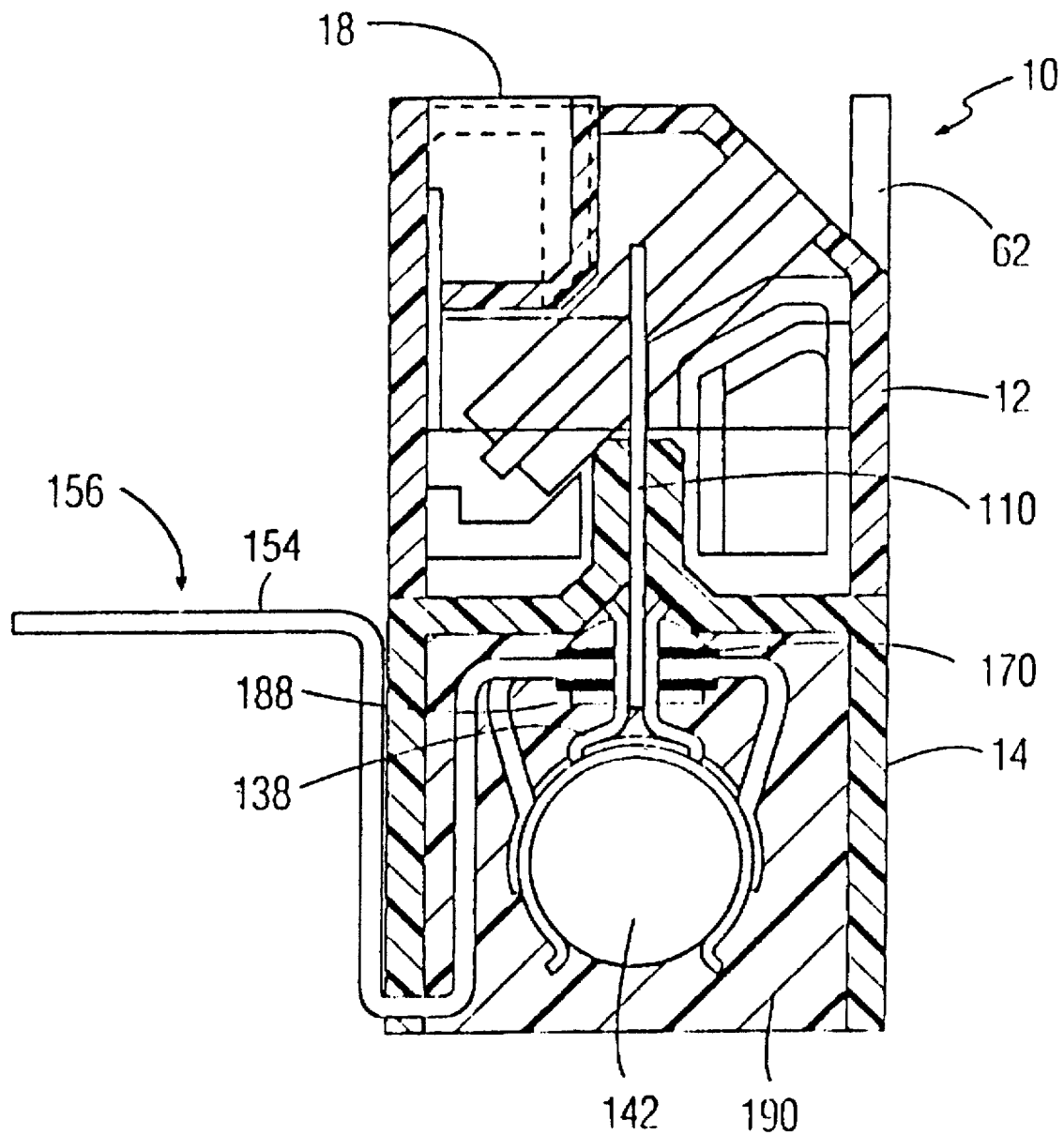
FIG. 4, is a cross-section view in elevation of the station protector module taken along line 4—4 of FIG. 2.

FIG. 4 is a cross-sectional end view in elevation of the weatherproof telephone station protector module to further clarify the location of the components as shown in FIGS. 1A and 1B.

In operation, the components are assembled as shown in the exploded view in FIGS. 1A and 1B. The upper housing member may be slipped over the lower housing member and retained in position by the elongated eye members which receive the protruding members therein that are disposed on the lower housing member, thereby keeping the upper and lower members together for easy assembly in the field. The wires to be connected together (shorted) are slipped into the combs and into the associated apertures keeping the terminal connections from one side of the line separate from the terminal connections on the other side of the communication line. The wires are guided at an angle into the apertures provided and are maintained in position as bolt 58 is slipped through the insert 60 held in aperture 102 and rotated, the upper housing member is moved towards the lower housing member compressing the wires inserted in the apertures therein. The cutting slots cut through the insulation on the wires inserted and shear the insulation therefrom at an angle determined by the slope of the wire guide members 38 and 40 thereby providing the best or optimum chance of making electrical conductive contact between the wires, since they are severed by the shorting terminal at an angle thereby providing reliable connections which are protected from the weather. The test terminals 18 and 20 make electrically conductive contact with the shorting terminals and therefore provide a convenient means for determining the voltage appearing on the two terminal lines. The test terminals may be filled with a non-conductive grease or gel, which prevent moisture from getting into the housing. The lower hollow housing may be filled with a potting compound 190 well known in the art.

Hereinbefore has been disclosed a weatherproof telephone station protector module which provides extreme reliability with regard to connecting wires together, since a cut in the insulation thereof is made at an oblique angle. The convenience set forth by having the upper housing member retained on the lower housing member so that the person making use thereof does not have to hunt and locate the pieces before he can start making the connections. The bolt may be of the type which is self-retained in the upper housing and therefore would still further reduce the need for requiring any additional pieces prior to utilization thereof. It will be understood that various changes in the details, materials, arrangement of parts and operating conditions which have been herein described and illustrated in order to explain the nature of the invention may be made by those skilled in the art within the principles and scope of the instant invention.

Having thus set forth the nature of the invention, what is claimed is:

1. A weatherproof telephone station protector module suitable for outside use exposed to the weather, comprising:
   A. an elongated hollow housing top member having a longitudinal axis and a transverse axis, a top surface, a front and rear surface and an open bottom, said top surface of said hollow housing top member including;
      i) a first and a second sealed test terminal disposed on said top surface, said first sealed terminal adapted to be in electrically conductive contact with a first group of shorting terminals, said second sealed test terminal adapted to be in electrically conductive contact with a second group of shorting terminals,
      ii) a plurality of through apertures spaced apart on said top surface at an oblique angle to the transverse axis of said hollow housing top member, each said through aperture being adapted to receive insulated electrically conductive wires therein,
      iii) a through aperture disposed between said first and said second sealed test terminals adapted to receive a threaded bolt therein,
      iv) the threaded bolt adapted to be received by said through aperture disposed between said first and second sealed test terminals, and
      v) a first pair of elongated eye members extending below said open bottom of said front surface and a second pair of elongated eye members extending below said rear surface of said hollow housing top member, each said pair of elongated eye members being adapted to receive a corresponding pair of protruding members, respectively, disposed on a front and a rear surface of an elongated hollow housing bottom member; and
   B. said bottom member being adapted to be received into said hollow housing top member and having a top surface, and an open bottom, said bottom member top surface including;
      i) a centrally disposed threaded aperture adapted to receive and cooperate with said threaded bolt,
      ii) a pair of elongated through slots, one being disposed on either side of said centrally disposed threaded aperture,
      iii) said first group of shorting terminals being disposed within one of said pair of elongated through slots, said second group of shorting terminals being disposed within the other of said elongated through slots, said first and said second group of shorting terminals being adapted to obliquely cut the insulation of each said insulated wire inserted into said first and second groups of shorting terminals on one distal end, the other distal end of said first and second group of shorting terminals extending into the hollow of said bottom member, at least one of the plurality of insulated wires being adapted to be inserted into said first group of shorting terminals and another one of the plurality of insulated wire being adapted to be inserted in said second group of shorting terminals,
      iv) ground terminal means adapted to be in electrically conductive contact with a ground potential,
      v) overvoltage protection means disposed within the hollow of said bottom member, said overvoltage protection means having three terminals, the first terminal of said overvoltage protection means being coupled, via a first holding bracket means, to one of said first and second groups of shorting terminals, the second terminal of said overvoltage protection means being coupled, via a second holding bracket means, to the other of said first and second groups of shorting terminals and the third terminal of said overvoltage protection means being coupled to said ground terminal means, via a back-up surge arrestor, vi) the back-up surge arrester comprising; a pair of back-up surge arresters disposed in the hollow of said bottom member, one of said back-up surge arresters being coupled between said ground terminal means and said first terminal of said overvoltage protection means, the other of said pair of back-up surge arresters being coupled between said ground terminal means and said second terminal of said overvoltage protection means, and vii) said first and second holding bracket means for removably retaining said overvoltage protection means, each of said first and said second holding bracket means being in electrically conductive contact with said first terminal of said overvoltage protection means one end of each said first and said second holding bracket means being in electrically conductive contact with one of said first and second group of shorting terminals;

wherein, when said bottom member is inserted into said hollow housing top member, and when said threaded bolt is inserted into said through aperture disposed between said sealed test terminals into said centrally disposed threaded aperture and rotated, each of the plurality of said insulated wires inserted into each of said first and second groups of shorting terminals, via said plurality of through apertures spaced apart on said top surface of said hollow housing top member, cause each of the plurality of said insulated wires disposed in said first group of shorting terminals to become in electrically conductive contact with each other and cause each of the plurality of insulated wires disposed in said second group of shorting terminals to become in electrically conductive contact with each other.

2. A weatherproof telephone station protector module according to claim 1, further including a plurality of finger-like members extending upwardly from said top surface of said hollow housing top member adapted to hold each of the plurality of insulated wires between said finger-like members.

3. A weatherproof telephone station protector module according to claim 1, wherein a portion of said top surface of said hollow housing top member, where said plurality of through apertures spaced apart on said top surface of said hollow housing top member are disposed, is positioned at an oblique angle to each of the plurality of insulated wires adapted to be inserted into said plurality of spaced apart through apertures.

4. A weatherproof telephone station protector module according to claim 1, wherein each said first and said second holding bracket means includes insulation means for insulating each of said first and said second holding bracket means from said ground terminal means.

5. A weatherproof telephone station protector module according to claim 4, wherein each said insulation means is a thermally sensitive material that shorts said first or said second holding brackets to said ground terminal means should the temperature of the surface of said overvoltage protection means exceed the melting point of said thermally sensitive material.

6. A weatherproof telephone station protector module according to claim 1, wherein said hollow housing top member and said first and second group of shorting terminals are provided with apertures suitable for receiving insulated wires of various wire gauge sizes.

7. A weatherproof telephone station protector module according to claim 1, wherein each said first and second groups of shorting terminals comprises:

A. a generally flat and elongated member having a longitudinal axis, and

B. at least one slot disposed in said member parallel to said longitudinal axis adapted to receive the conducting portion of each of the plurality of insulated wires therein.

8. A weatherproof telephone station protector module according to claim 1, wherein said threaded bolt is captive in said top surface of said hollow housing top member.

9. A weatherproof telephone station protector module according to claim 1, wherein said ground terminal means extends outwardly from said hollow rear surface of said hollow bottom member.

10. A weatherproof telephone station protector module according to claim 1, wherein said overvoltage protection means is a solid state semiconductor.

11. A weatherproof telephone station protector module according to claim 1, wherein each said sealed test terminal is filled with a nonconducting grease means.

12. A weatherproof telephone station protector module suitable for outside use exposed to the weather, comprising:

A. an elongated hollow housing top member having a longitudinal axis and a transverse axis, a top surface, a front and rear surface and an open bottom, said top surface of said hollow housing top member including;

i) through apertures spaced apart on said top surface at an oblique angle to the transverse axis of said top member, each said through aperture adapted to receive insulated electrically conductive wires therein, ii) a centrally disposed through aperture adapted to receive a captive threaded bolt therein, iii) the captive threaded bolt adapted to be received by said top member centrally disposed through aperture; and B. an elongated hollow housing bottom member adapted to be received into said hollow housing top member, said hollow housing bottom member having a top surface and an open bottom, said hollow housing bottom member top surface including;

i) a centrally disposed threaded aperture adapted to receive and cooperate with said captive threaded bolt, ii) a pair of elongated through slots, one being disposed on either side of said centrally disposed threaded aperture, iii) a first and a second shorting terminal, one of said first and said second shorting terminals being disposed within each said elongated through slots, said first and said second shorting terminal being adapted to obliquely cut the insulation of insulated electrically conductive wires inserted into said first and said second shorting terminals on one distal end with the other distal end extending into the hollow of said hollow housing bottom member, iv) ground terminal means, v) overvoltage protection means disposed within the hollow of said hollow housing bottom member, said overvoltage protection means having three terminals, the first terminal of said overvoltage protection means being coupled to one of said first and second shorting terminals, the second terminal of said overvoltage protection means being coupled to the other of said first and second shorting terminals, via a thermally sensitive means insulator, and the third terminal of said overvoltage protection means being connected to said ground terminal means, and vi) holding bracket means for removably retaining said overvoltage protection means, said holding bracket means being in electrically conductive contact with said ground terminal means, one end of said holding bracket means being in electrically conductive contact with one of said first and second shorting terminals, the other end of said holding bracket means being in electrically conductive contact with the other of said shorting terminals, said overvoltage protection means first and second terminals being insulated from said ground terminal means, via a thermally sensitive insulator;

wherein when said hollow housing bottom member is inserted into said top member, and when said captive threaded bolt is inserted into said top member centrally disposed through aperture and said hollow housing bottom member centrally disposed threaded aperture and rotated, each of the plurality of said insulated wires inserted into each said shorting terminal, via said through apertures spaced apart on said top surface of said hollow top member cause each of plurality of said insulated wires disposed in said first group of shorting terminals to become in electrically conductive contact with each other and cause the insulated wires disposed in said second shorting terminal to become in electrically conductive contact with each other.

13. A weatherproof telephone station protector module according to claim 12, further including a plurality of finger-like members extending upwardly from said top surface of said hollow housing top member adapted to hold each of the plurality of insulated wires between said finger-like members.

14. A weatherproof telephone station protector module according to claim 13, wherein a portion of said top surface of said hollow housing top member where said plurality of through apertures spaced apart on said top surface of said hollow housing top member are disposed is positioned at an oblique angle to each of the insulated wires adapted to be inserted in said plurality of through apertures.

15. A weatherproof telephone station protector module according to claim 13, wherein said holding bracket means comprises:
  A. a unitary holding bracket disposed in the hollow of said unitary hollow housing bottom member, said holding bracket being in electrically conductive contact with said ground terminal means, and
  B. the thermally sensitive insulation means insulating said unitary holding bracket from said first and said second terminal of said overvoltage protection means.

16. A weatherproof telephone station protector module according to claim 13, wherein said thermally sensitive insulation means is a thermally sensitive material that shorts said first and said second terminals of said overvoltage protection means to said ground terminal means should a temperature on a surface of said overvoltage protection means exceed the melting point of said thermally sensitive material.

17. A weatherproof telephone station protector module according to claim 14, wherein said hollow housing top member and said first and second shorting terminals are provided with apertures suitable for cutting each of the plurality of insulated wires up to a predetermined gauge size.

18. A weatherproof telephone station protector module according to claim 13, wherein said first and second shorting terminals are elongated and have a longitudinal axis, are generally flat, and include at least one slot parallel to said longitudinal axis and each slot is adapted to receive the conducting portion of each of the insulated wires inserted into said slot.

19. A weatherproof telephone station protector module according to claim 13, wherein said ground terminal means extends outwardly from the rear surface of said hollow housing bottom member.

20. A weatherproof telephone station protector module according to claim 13, wherein said overvoltage protection means is a solid state semiconductor.

21. A weatherproof telephone station protector module according to claim 1, wherein said first and second shorting terminals are provided with at least one slot having sharp edges suitable for cutting the insulation of each of the plurality of insulated wires inserted into said slot.

22. A weatherproof telephone station protector module according to claim 21, wherein said slots are of different widths suitable for accepting each of the plurality of insulated electrically conductive wires up to a predetermined gauge size.

* * * * *